United States Patent [19]

Bozman

[11] Patent Number: 5,089,952
[45] Date of Patent: Feb. 18, 1992

[54] METHOD FOR ALLOWING WEAK SEARCHERS TO ACCESS POINTER-CONNECTED DATA STRUCTURES WITHOUT LOCKING

[75] Inventor: Gerald P. Bozman, Oakland, N.J.

[73] Assignee: International Business Machines Corporation, Armonk, N.Y.

[21] Appl. No.: 255,000

[22] Filed: Oct. 7, 1988

[51] Int. Cl.⁵ .......................... G06F 7/00; G06F 9/36; G06F 7/34
[52] U.S. Cl. ...................... 395/725; 364/200; 364/222.81; 364/222.82; 364/251.6; 364/261; 364/261.3; 364/900; 364/274; 364/282.1; 364/282.3; 364/962; 364/962.1; 364/974.6; 364/DIG. 1; 364/DIG. 2; 395/775
[58] Field of Search ... 364/200 MS File, 900 MS File

[56] References Cited

U.S. PATENT DOCUMENTS

| | | | |
|---|---|---|---|
| 4,054,911 | 10/1977 | Fletcher et al. | 358/141 |
| 4,236,227 | 11/1980 | Bull et al. | 365/49 |
| 4,318,184 | 3/1982 | Millet et al. | 364/900 |
| 4,479,196 | 10/1984 | Ferrer et al. | 364/900 |
| 4,561,051 | 12/1985 | Rodman et al. | 364/200 |
| 4,590,586 | 5/1986 | Zenk et al. | 364/900 |
| 4,611,272 | 9/1986 | Lomet | 364/200 |
| 4,677,550 | 6/1987 | Ferguson | 364/200 |
| 4,725,870 | 4/1988 | Felchek et al. | 340/172.5 |
| 4,823,310 | 4/1989 | Grand | 364/900 |
| 4,914,569 | 4/1990 | Levine et al. | 364/200 |

OTHER PUBLICATIONS

Douglas Comer, "The Ubiquitous B-Tree" ACM Computing Surveys, vol. 11 No. 2, Jun. 1979 pp. 121-137.
Yat-Sang Kwong, "A New Method For Concurrency in B-Trees" IEEE Transactions on Software Engineering, vol. SE-8, No. 3: pp. 211-222, 5-82.

*Primary Examiner*—Thomas C. Lee
*Assistant Examiner*—Mehmet Geckil
*Attorney, Agent, or Firm*—Ronald L. Drumheller

[57] ABSTRACT

A method for allowing weak-searchers of a B+-tree avoid locks that serialize access to the B+-tree structure. The update technique used to achieve this ensures that the B+-tree is always in a correct state on secondary storage so that repair is not necessary after a system failure. The assumption is made that the readers will complete their reading within a specified period but sometimes will need to be restarted because they have not completed their reading within a predetermined time period.

11 Claims, 8 Drawing Sheets

FIG. 6
PROCEDURE FOR WEAK-SEARCHER

FIG. 7

METHOD FOR ALLOWING WEAK SEARCHERS TO ACCESS POINTER-CONNECTED DATA STRUCTURES WITHOUT LOCKING

BACKGROUND OF THE INVENTION

I. Field of the Invention

The present invention relates generally to data structures for secondary storage of computer data and more specifically to an optimized structure to increase concurrency for readers of data structures.

II. Description of the Prior Art

Modern computer systems are very often used to search for and use specific data that can only be found amongst large amounts of data. The organization of the data and the methods for accessing it are extremely important, since adoption of efficient techniques can significantly increase system performance and throughput.

In many computer software and systems high performance and throughput gains may be obtained through the usage of high degrees of parallelism, i.e having more than one process active at any given time. Within that parallelism it is still necessary that the separate processes not interact with each other in such a way that inconsistent data structures are created. Typically a technique called 'locking' is used to assure that no two processes can make a change to the same data structure at the same time. Locking is also used to assure that processes that are reading, but not changing, the data are no longer present. Multiple readers are often permitted in the absence of a writing process.

In practice, readers are seldom operating in the same part of a data structure as the writers. Additionally, pure readers, that is, readers having no intent to update, are usually wear searchers. This is particularly true when the reading process is searching for a single object (e.g. a record) instead of multiple objects that may have an abstract interrelationship.

As is well known to skilled computer programmers and system designers, many techniques for structuring data files have been proposed. The selection of the file organization depends upon the type of file retrieval to be performed. Broadly speaking, there are two types of file retrieval needed, namely sequential and random.

In many common file organization types, there is an index to the data that speeds the searcher by directing it to the part of the file containing the searched for item.

Usually, a unique key is assigned to each item in the file and retrieval is performed by specifying the key. A file may be considered as a set of n records containing the file information and a key that is uniquely associated with the file information. It is assumed that the key uniquely identifies the record.

A user may conduct various types of transactions against a file including the insertion, deletion retrieval and updating of the file records. Four basic operations support these transactions:

1. INSERT: Adds a new record making sure that the key is unique.
2. DELETE: Remove the record indicated by a key.
3. FIND: Retrieves a record indicated by a key.
4. NEXT: Retrieves the next group of information.

Since its introduction by Bayer and McCreight, "Organization and maintenance of large ordered indices," *Acta Informatica*, vol. 1, pp. 173-189, 1972, the B-tree has become popular as a method for organizing and maintaining large ordered indices of dynamic random-access files. Variants of the original algorithm have been popular. The present invention applies to leaf search B-trees, which is a variant developed by Wedekind, H., "On the selection of access paths in a data base system," in *Data Base Management*, Klimbie, J. W. and Koffeman, K. L. (Eds.), North-Holland, 1974, pp 385-397, which have been called B+-trees in Comer, D., "The ubiquitous B-tree," *ACM Computing Surveys*. vol. 11, pp. 121-138, 1979. and B*-trees in Bayer, R. and Unterauer, K., "Prefix B-trees," *ACM Trans. on Database Systems*. vol. 2, 1 (March 1977), pp. 11-26, and Wedekind. The terminology of Comer, B+-tree, is used in the present description to refer to leaf search B-trees.

It is often desirable that weak searchers of B+-trees not be required to use locks within the B+-tree itself. A weak searcher is a reader with no intent to update. A weak-search returns a result that was valid at some time during the search, but is not guaranteed to be current at the time of search termination. If, however, a weak-searcher has obtained a lock on the object of the search before starting to traverse the B-tree, then, using this invention it will be guaranteed a valid (i.e, current) object at the time of search termination.

Not requiring weak searchers to use locks is especially beneficial if most accesses are by weak searchers, or if a lock on the object of the search is obtained before commencing the search, or in distributed applications where the lock facility may be remote to some subset of the sharing systems. The benefits are increased concurrency and reduced overhead due to lock traffic.

Lehman, P., and Yao, S., "Efficient locking for concurrent operations on B-trees," *ACM Trans. on Database Systems*, 6, Dec. 1981, pp. 650-670, describes a method that does not require readers to lock called the B-link tree, which does not define methods for the contraction of the B-tree in the traditional manner. Although this might be acceptable in a tree that is either stable or changing with uniformly distributed insertions and deletions, it is not generally robust. In particular, the result of 0.69 mean density, described in Yao, A. "On random 2-3 trees," *Acta Inf.* 9, 2 (1978), 159-170, will not hold. In addition, the B-link tree is not amenable to the application of shadow update which is used to perform an atomic update involving more than one node.

Typically the process of obtaining a lock is expensive. The presence of readers delays the start time of a writer until the readers have finished, which tends to reduce the parallelism of the system. Systems known in the art have not allowed pure readers to operate without locking.

Accordingly, it is an object of the invention to provide a method for efficiently accessing data structures in parallel systems.

It is a further object of the invention to provide a method that permits weak searchers to operate without requiring locking.

These, and other, objects, advantages, and features of the invention will be more apparent upon reference to the description and the appended drawings.

SUMMARY OF THE INVENTION

In accordance with a preferred but nonetheless illustrative embodiment demonstrating objects and features of the present invention there is provided a method that allows weak-searchers of a B+-tree to avoid locks that serialize access to the B+-tree structure. The update technique used to achieve this ensures that the B+-tree is always in a correct state on secondary storage so that repair is not necessary after a system failure.

The assumption is made that the weak searchers will have completed their reading within a specified period but sometimes will need to be restarted because they have in fact not completed their reading within this time period. This assumption yields higher degrees of concurrency for both readers and writers.

In situations where the readers only require a locally consistent view of data it is feasible to allow the writers to change data structures while readers continue to access them without requiring the readers to obtain locks. The readers are able to measure the elapsed time from obtaining a valid pointer to the data structure and are able to restart if they fail to complete reading within a predetermined period of time.

DESCRIPTION OF THE PREFERRED EMBODIMENTS

The method of the present invention applies to data structures connected by address pointers. Such data structures include trees, lists and certain types of tables (for example, a hash table with chained overflow buckets). Hereinafter the elements of these structures will be referred to as nodes. Each node in the structure except the terminal node contains a pointer to another node. This method is feasible if readers either:

1. search for objects that are completely contained in one node or a small subset of logical neighbors. (Tree siblings that have a common parent are examples of logical neighbors). An update strategy that allows this type of search maintains local consistency within the data structure.

2. search for multiple objects contained in multiple nodes that have no abstract inter-relationship. An example of this type of search would be a search of all telephone numbers of all employees whose first name is "Alfred." In this query it wouldn't matter if an entry were inserted, deleted or modified during the search.

This strategy guarantees a reader that any disconnected node will be preserved for some interval of time before it is reused and its previous contents thereby destroyed. This is done by either:

1. having writers who modify or delete a node leave the old nodes unmodified for a specified period of time. Once this specified period of time has elapsed the writer is free to reuse the storage. This usually means having a time delay between the time the storage is returned to a free storage manager and the time that it may be given out for reuse by the free storage manager.

2. reusing the node but only in the same structure, or adding an object identifier to every data object so that a reader can determine that the node no longer is a member of the same structure. In addition, the node must contain sufficient auxiliary identification so that, if it is reused as another node of the same structure, a reader can determine that this has occurred.

Thus, in case 1, if a reader atomically computes the time interval between obtaining a pointer to a node and completing its search of the node, it can compare this to the specified time interval and a)proceed if its duration is less than the specified time interval or b)restart if its duration exceeded the specified time interval. The specified time interval is selected so that it both insures that a high percentage of the readers will complete without a restart and that only a small amount of storage will be in a pending state. Also, in practice a reader should abort short of the specified time interval by an amount that represents the maximum error in measuring elapsed time.

In case 2, a reader restarts when it reaches a node that is either no longer a part of the same structure or has been reused as another node of the structure.

Various techniques may be used by writers to assure that a valid data structure is left for a reader that already has a pointer. One technique is indirect allocation, also known as "shadow writing." Shadow writing consists of creating a new node in a different memory area. In one atomic update the writer changes the pointer to the new node or nodes. Thus, if a reader has yet to obtain the pointer the reader will see the new nodes, or continue to see the old nodes until it is reused. Since it will not be reused for the specified time interval the reader must make its reference within that interval.

If the data structure used is a tree, which, as stated above, is typical in database systems, a change to the data structure shadows a complete subtree to a point that a single atomic update can prune the old branches and attach new ones. Hereinafter, the invention will be described with respect to B+-trees.

B+-TREE DEFINITION

Figure 1:
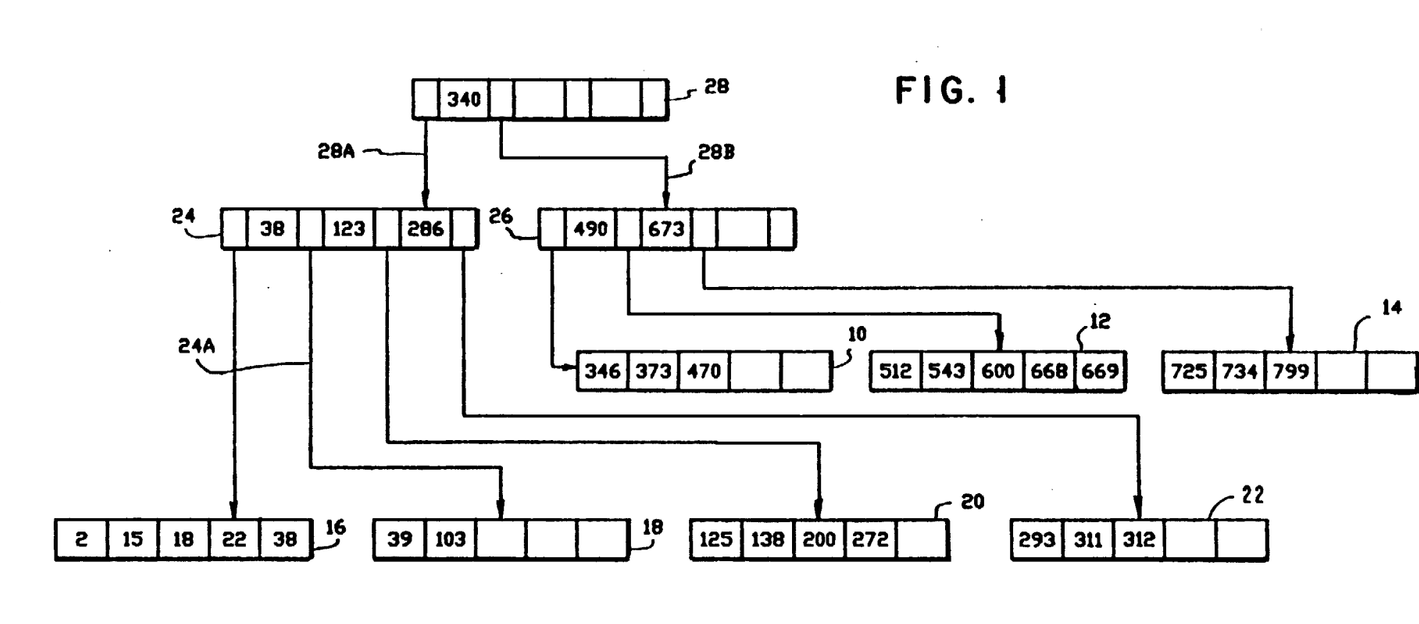
FIG. 1 shows a 4th order B+-tree.

For the purposes of the present description a B+-tree is a leaf search tree in which all keys (and possibly associated data) appear in the external nodes (i.e., leaves) and the internal nodes contain separator keys which provide a route to the leaves. These separator keys are often called routers and the routing scheme can affect concurrency (Kwong, Y. and Wood, D., "On B-trees: routing schemes and concurrency," *ACM/SIGMOD Int. Conf. Management of Data*, 1980, pp. 207-213). In FIG. 1 the leaves are nodes 10-22, and the internal nodes 24-28 contain routers.

Thus, referring to the example of FIG. 1, if one were to search for key 103, starting at node 28, path 28A is taken since, it is to the left of key 340 and 103 is less than 340. At node 24, path 24A is taken since this path is more than 38 and less than 123. This, in turn leads to node 18, where key 103 is found.

Specifically a B+-tree of order m has the following properties:

1. Each routing node has at most m sons.

2. Each routing node except for the root has at least ceiling $$\left(\frac{m}{2}\right)$$

sons. The function celing(x) is defined as that function that finds the smallest integer greater than or equal to the argument.

3. The root has at least two sons.
4. All leaves must appear at the same level.
5. All keys that exist in the tree appear in the leaves. Usually they are ordered within each leaf. The leaves may also contain data associated with each key. This is often a pointer to a record that is disjoint from the index, but may be a data record that is integrated into the B+-tree. The data may be variable in length, but for simplicity we assume that the key, or key and its associated data, are fixed in length for the entire tree. Variable or large fixed-length data can be maintained by some segmentation scheme, but that is not within the scope of this invention. The present description will use "key/-data" to refer to either keys only or keys and their associated data, whichever is appropriate to a particular implementation. Therefore:

6. All leaves contain at most m'-1 and at least ceiling $$\left(\frac{m'}{2} - 1\right)$$

keys or key/data elements. We note that m' has no formal relation to m. That is, m' may be less than, greater than, or equal to m.

The level of a node is 1 if it is the root, and the level of its parent plus 1 otherwise. B+-tree nodes of the same type (i.e., leaves, non-leaves), and frequently all nodes, are pages of fixed size. Therefore, B-trees in general are often called page trees or multiway page trees.

For ease of discussion, m is used to refer to both m or m', and, where the distinction is not important, element key/data. Also the use of leaves father-of-leaves level in much of the literature.

The B+-tree of FIG. 1 has m=4 and m'=6. The ($\leq$, <) routing scheme is used herein for non-leaf nodes. This routing scheme is defined as follows:

In any non-leaf node containing j routers, r, $1 \leq r \leq j$, and j+1 pointers, p, $0 \leq p \leq j$, let $S(p_i)$ be the subtree pointed to by $p_i$. Then in the ($\leq$, <) routing scheme, routers, r, satisfy the following: for $1 \leq i \leq j$, all keys in $S(p_{i-1}) \leq r_i$ all keys in $S(p_i)$.

Two examples of the many uses of leaf search B-trees are:

1. A dictionary where the keys are words or symbols.
2. A file directory where the keys are file names and the data associated with each key may be, for example, file attributes and pointer(s) to the file data.

Readers

In this description reader is used to mean a pure weak-searcher or a "weak-searcher" whose search has been strengthened by means of an external lock on the object of the search. The B+-tree is atomically changed from one consistent state to a succeeding consistent state. It is therefore always in a state that is not prone to contamination in the event of system failure during a restructuring operation.

Livelock is theoretically possible in this invention as it is likely to be in any solution that allows concurrent reading and writing of any data structure. This invention, however, is of primary value when there are more readers than writers, and since B+-tree restructuring occurs approximately once every $$\frac{m}{2}$$

livelock will tend not to be a practical problem. At any rate, solutions for livelock such as that mentioned in Lehman and Yao can be implemented if necessary.

Storage model

Figure 7:
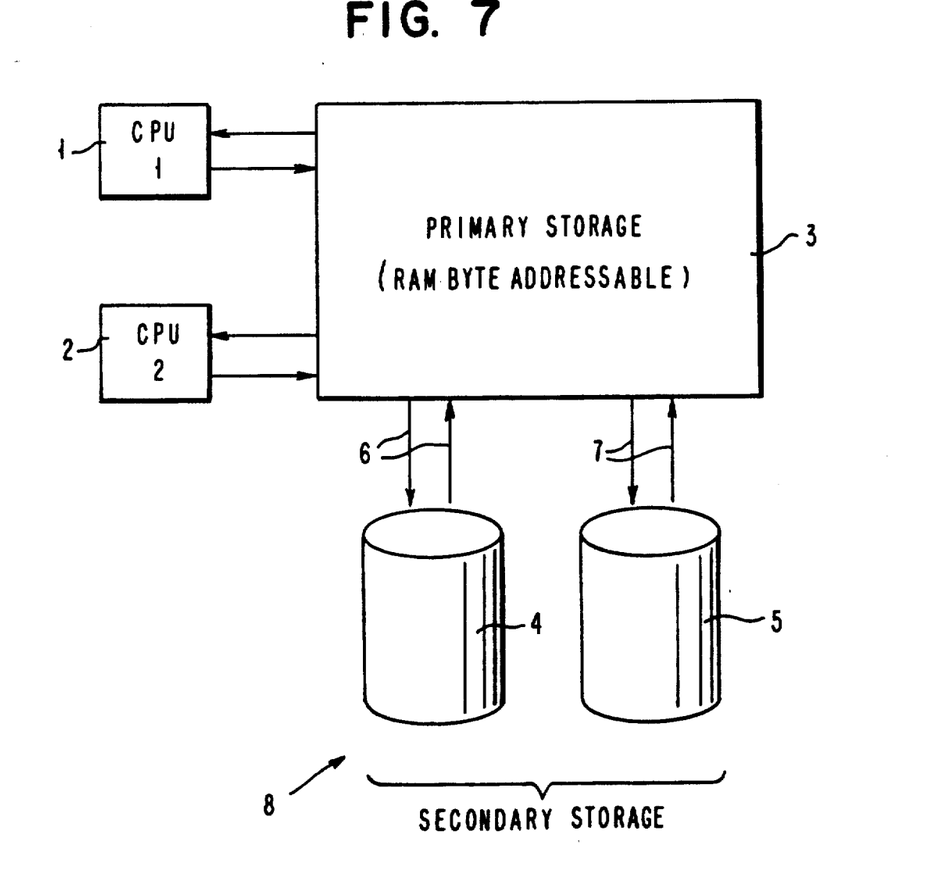
FIG. 7 is a diagram of a computer system on which the present invention may be implemented.

Referring now to FIG. 7, the pages (i.e., nodes) of the B+-tree are stored on a secondary storage device, for example a disk 4 or 5. Multiple processes may concurrently read and modify the B+-tree. These processes may exist in one or more computer systems. For our purposes a computer system consists of a primary store 3 connected to one or more processors 1 or 2. A process can read or write only one page at a time but can have multiple pages simultaneously accessible in primary storage 3. For simplicity it is assumed that an output operation that writes a node via paths 6 or 7 from primary storage 3 to secondary storage 8 is indivisible. A process modifying a node in the B+-tree works on a private copy of the node in primary memory 3 and then introduces the node into the B+-tree by writing it from primary memory 3 to secondary storage 8.

Nodes whose key range has been modified are written to secondary storage 8 in new page locations rather than their existing locations. This technique of writing to new locations is often called shadowing or shadow updating.

Locking

Processes that intend to modify the contents of a page in the B+-tree must first lock the page. Updaters may use any locking technique that ensures the correct serialization of B+-tree modifications. A lock gives a process exclusive modification rights to a page. Readers do not have to use locks and are never prevented from accessing a page. The invention is not concerned with the details of the locking discipline or its implementation in a distributed environment. Early researchers on the subject of concurrent operations on B-trees noted the following relevant fact concerning updaters. Using the terminology of Kwong and Wood (Kwong, Y. and Wood, D., "A new method for concurrency in B-trees," *IEEE Trans on Software Engineering*, vol 8 no. 3, pp. 211-222, May 1982.), for any updater U there exists a node which is the root of the minimal subtree which completely contains all structural and data changes that will result from the update operation. This is called the deepest safe node for U and the path from it to a leaf the scope of U. Specifically a node in a B-tree is insertion-safe if it is not full, i.e., it has less than m-1 keys, and it is deletion-safe if it is not minimal, i.e., it has more than ceilng $$\left(\frac{m}{2} - 2\right)$$

keys.

SHADOW UPDATING

The following procedures must be followed by updaters to enable readers to traverse the B+-tree without using locks. Additionally it yields a B+-tree that never contains redundant data and is always consistent.

Insert

Before changing the B+-tree, an INSERT process first locks its scope using some locking protocol. As a result the subtree whose root is the deepest safe node will remain locked when the insertion point is found. This subtree will in its simplest form be a safe leaf node in which the new key and data can be inserted without causing an overflow. Otherwise it is the deepest safe node which is the parent of a descendant path that is not insertion-safe and will therefore result in node split(s) due to the insertion. The traditional way of accomplishing this is to split the leaf node which is receiving the new key into nodes containing ceiling $$\left(\frac{m'}{2} - 1\right)$$

and m'-ceiling $$\left(\frac{m'}{2}\right)$$

key/data elements respectively, and add the new element to the appropriate node. This then causes the propagation of a router/pointer element to the parent, which will cause overflow if the parent is not insertion-safe. Therefore, this "upward" propagation can occur recursively until the deepest insertion-safe node is reached.

In this invention the traditional method is modified by the use of shadow updating as follows:

If the leaf node is insertion safe then the new data is inserted and the leaf node is written to its existing location on secondary storage (i.e., in-place ). Otherwise, for each splitting node up to the deepest insertion-safe node, the two new nodes replacing the former node are written to new secondary storage locations rather than their existing location. That is, both nodes resulting from the split are written in their final form to new secondary storage locations leaving the B+-tree in its former consistent state. They are connected to the tree by the insertion of the new router into an insertion-safe node along with the two new pointers. The insertion-safe node is then written to its existing location on secondary storage. As a result of this operation, the B+-tree is transformed into its new consistent state. After the update has been completed the process must manage the return/reuse of the secondary storage nodes associated with the old and now detached branch. This must be done in such a way as to ensure that any readers still navigating this branch get correct results. The methods for doing this will be described herein.

Figure 2A:
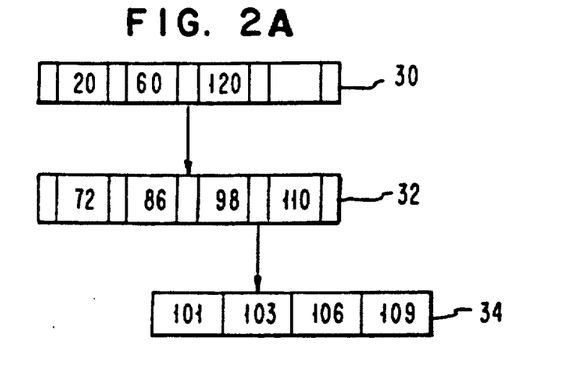
FIGS. 2A, 2B, and 2C show an insertion example.
Figure 2B:
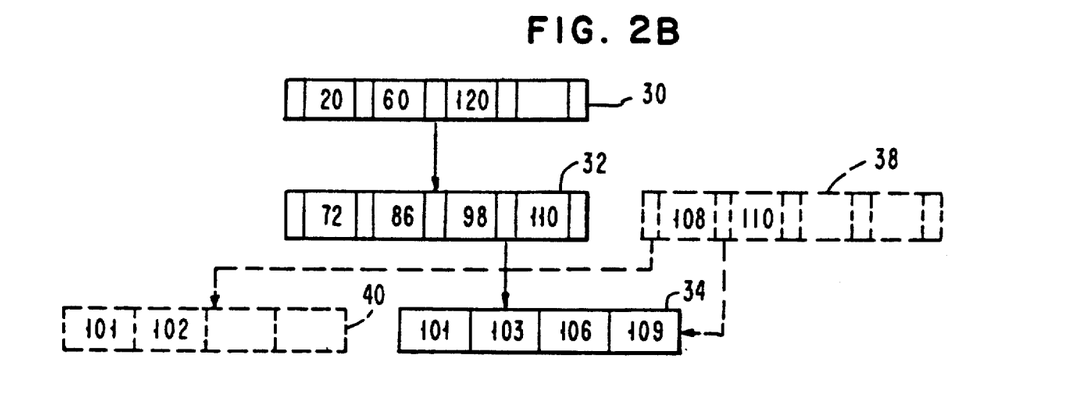
Figure 2C:
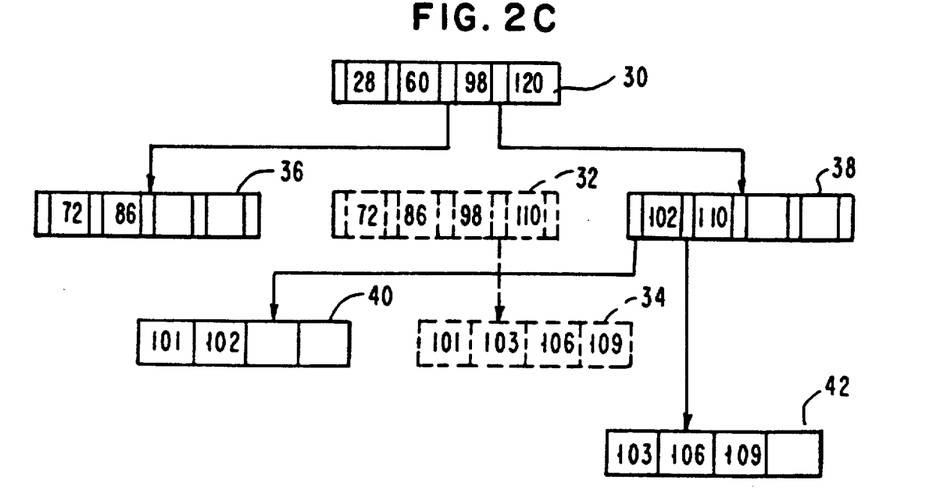

The new solution for insertion is illustrated in FIGS. 2A, 2B, and 2C. FIG. 2A depicts a portion of a B+-tree having three nodes 30, 32 and 34 before the insertion of an element 102. FIG. 2B shows the state after the new shadow updated nodes 36, 38, 40 and 42 (resulting from the overflows) have been written, but before they have been connected to the insertion-safe node 30. In FIG. 2C the shadowed nodes have been connected to node 30 via the insertion of key 98 into node 30 and its two adjacent pointers. Note that the former path is now disconnected from the tree.

Delete

A delete process locks its scope using a locking protocol in the same way as the insert process. The target element is then deleted with a possible consequent merge (due to under-flow) until a key rotation or deletion in the deletion-safe node occurs. In this invention, in order to allow readers to traverse the B+-tree without the use of locks, deletion is managed as follows:

If the node containing the deleted element does not under-flow as a result of its deletion, then that node is written in-place and the process is done. Otherwise the immediate sibling(s) that receive(s) the merging elements is (are) shadow updated by being written to new secondary storage allocations. (An immediate sibling is adjacent in the common parent. Therefore, the nodes designated by the leftmost and rightmost pointers have only one immediate sibling. All other children of the parent have two immediate siblings). If this merging procedure is terminated by a key rotation, then the siblings involved in the rotation are also shadow updated. In this case, the parent involved in the key rotation is written in-place thereby connecting the new nodes to the tree. If this merging procedure is completed by a deletion in a deletion-safe node then the new shadow-written branch is connected to the tree at this time and the deletion-safe node is written in-place. Both methods disconnect the old branches from the tree, so it must be ensured that any readers in the disconnected branch finish their search correctly. Techniques for accomplishing this will be discussed in the next section.

Figure 3A:
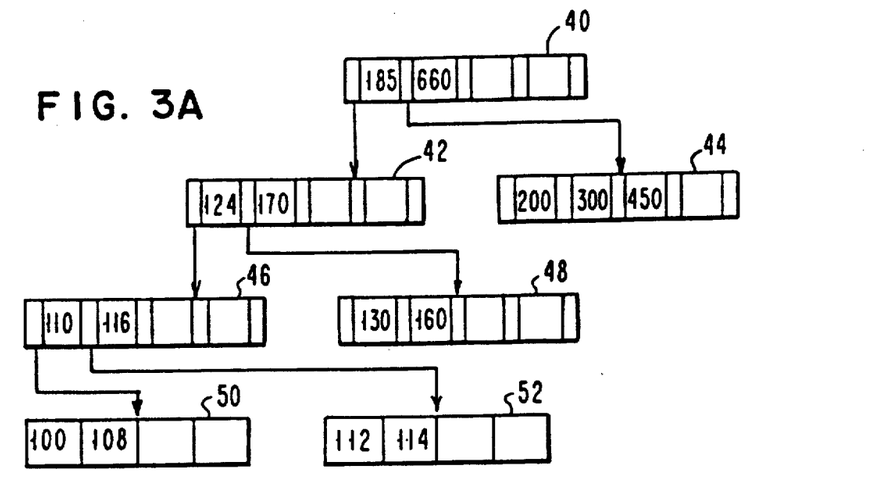
FIGS. 3A, 3B, and 3C show an example of deletion with shadow updating.
Figure 3B:
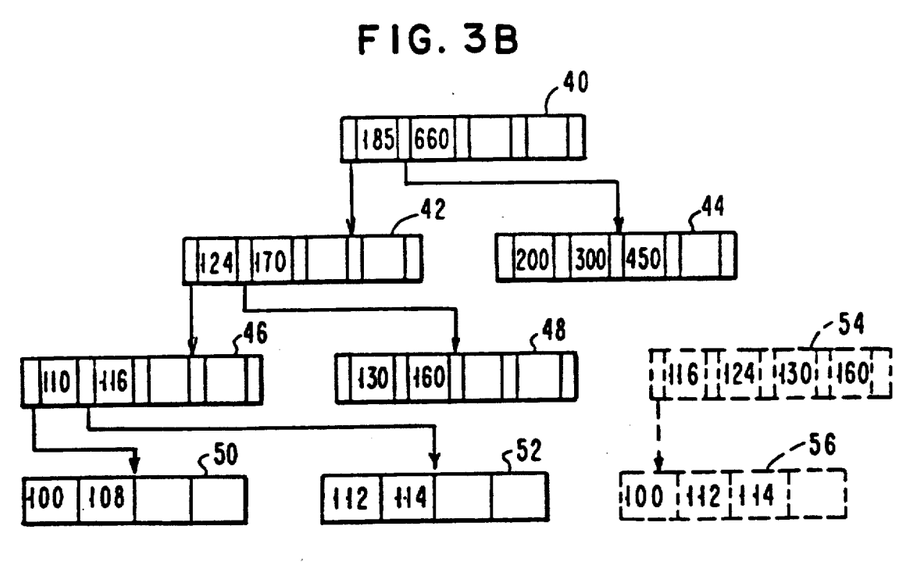
Figure 3C:
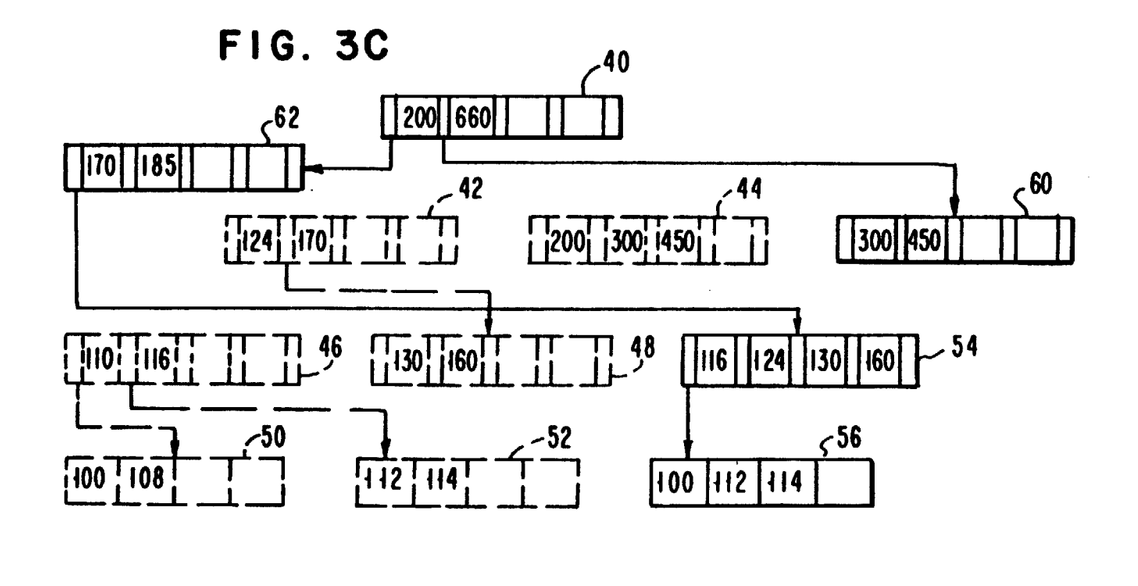

FIGS. 3A, 3B and 3C illustrate the new method of deletion according to the present invention. FIG. 3A illustrates a portion of a B+-tree having nodes 40-52 before the deletion of element 108. In FIG. 3B the two new shadow updated nodes 54 and 56 resulting from the underflow of the leaf and its parent are dotted. In FIG. 3C the same portion of the B+-tree is shown after the rotation has connected the shadowed nodes. The former nodes that are now disconnected, 42-52, are also shown dotted. Note that nodes 42 and 44 were updated by shadow writing the corresponding nodes 62 and 60 in order to rotate the routers 185 and 200. This rotation was completed by replacing router 185 with 200 in the root and then writing the root in-place.

The use of shadow updating to achieve "local" consistency for a restructure operation has been described. The technique, however, can also be used to achieve a larger range of consistency. For example, any number of logically connected but physically disjoint elements in the B+-tree can be atomically changed by shadow updating until a common node, i.e., the root of the minimal subtree which contains all of the changed elements, is reached, at which point the entire set of changes is introduced in one operation.

Reuse of disconnected nodes

As previously mentioned, readers can be left in disconnected nodes of the B+-tree. It is necessary that these nodes either not be reused until all readers that may be using them have completed reading or those readers be alerted to restart their search. There are three solutions:

1. Disconnected nodes are not reused until some time increment, Δt, after they are disconnected. Readers register their time of entry to the B+-tree, and before using (or reporting) the results of any node search, they check to see if Δt has expired since their search began. If it has, they restart the search at the root; if not they continue. In any particular implementation some value of Δt can be chosen that a) ensures a very low probability of readers "timing out" and b) does not accumulate an excessive amount of nodes on "hold".

For example, consider a B+-tree where four nodes must be read to reach a leaf, each node requires an average of 20 milliseconds to process (including wait time), and there are an average of 100 nodes shadow written per second. Then if Δt is set to 250 milliseconds, there will be a very low amount of restarting and the average number of nodes on hold would be 25.

In a distributed environment there is no need to synchronize clocks to support this method since interval and not real time is used. In practice, the process that holds disconnected nodes before they are reused should add some small time increment to Δt that is sufficient to cover any error in the relative dynamic accuracy of all of the clocks (i.e., the difference between the "fastest" and "slowest" clocks over the interval Δt).

2. Disconnected nodes can be unconditionally reused if it is certain that all active readers have terminated, since then the node is reusable in any object because there is no longer a path to it in the B+-tree.

Disconnected nodes can be used only as nodes in the same B+-tree if it is not certain that all readers that were active at the time of their disconnection have terminated. In this case, if there are active readers (that may be traversing the disconnected branch) and the node is reused in the same B+-tree, then one of the following two techniques must be implemented so that readers can determine if a node has been reused (and therefore the reader must restart its search):

a. Readers can check the key range and level of the node before searching. This is accomplished by adding to each node the key range and level number. For all nodes but the root, the key range is defined by the routers of the parent(s). For example, in FIG. 1 the key range of node 18 is 39–123. For the root it is the key domain of the B+-tree. or
   b. A time value that specifies the time the node was added to the structure is added to each node of the B+-tree. Readers check this field before using or reporting the results of any node search and if it contains a time later than their entry to the tree they restart at the root.

3. If the file system supporting the B+-tree contains an affix which further identifies each data page, then a unique identifier for each object in the file system can be placed therein. In this case the disconnected nodes may be reused. The read process then checks the object identity in the affix to ensure that it is still in the B+tree structure and uses one of the two techniques listed under method 2 to determine if the node has been reused. All three methods will cause readers to occasionally restart unnecessarily, but will protect any readers in disconnected nodes. Method 1 will cause less (usually no) restarting at the expense of some amount of secondary storage space on temporary hold. Methods 2 and 3 allow nodes to be reused as needed but will tend to incur more reader restarting.

These methods implement optimistic concurrency for readers only. They use a straightforward method of determining during the search process whether the results may be invalid.

EXAMPLE

The following describes the implementation of the invention using a file system which contains an affix containing a unique (for all time) object identifier.

Figure 4:
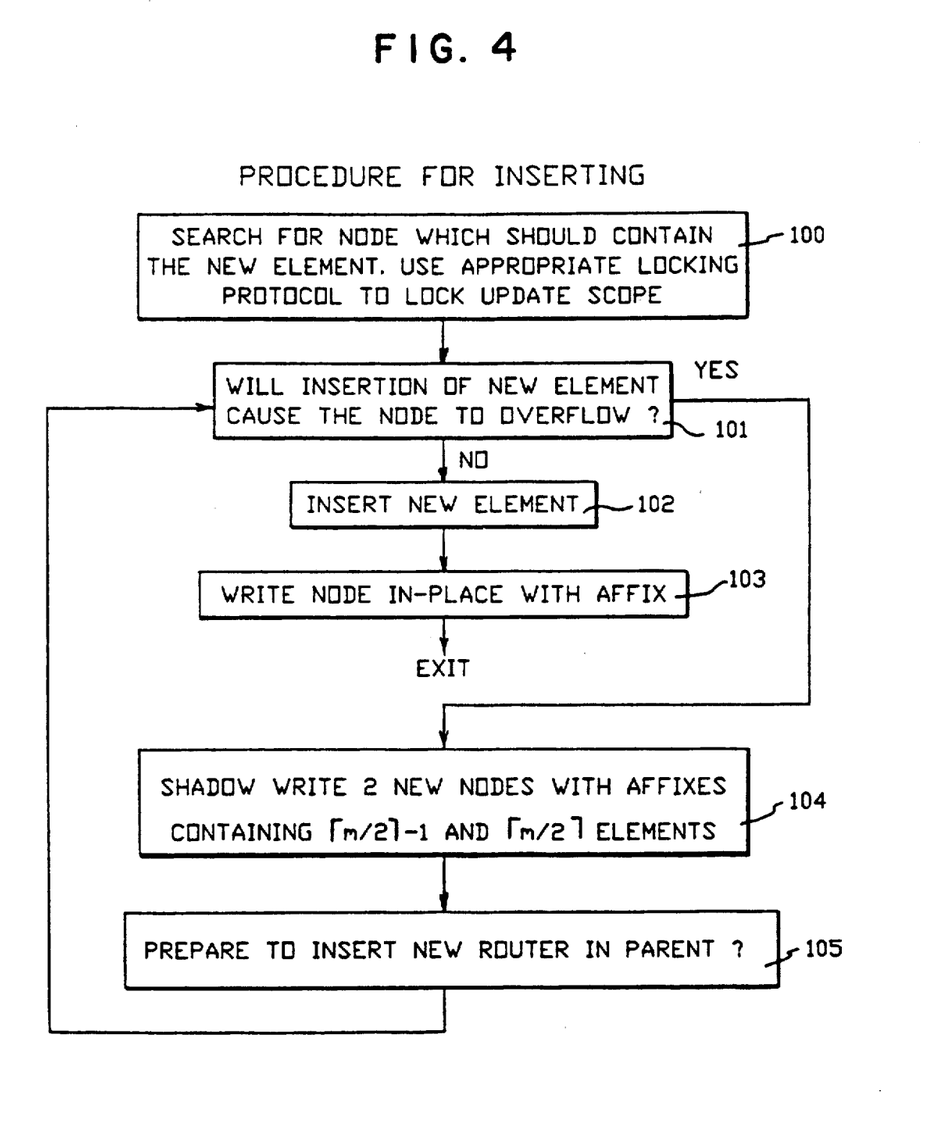
FIG. 4 is a flow diagram of insertion according to the present invention.

FIG. 4 shows the procedure that is followed during the insertion of a new element in the B+-tree. The standard B+-tree search technique is used to find the leaf node that is to contain the new element (logic block 100). An appropriate locking protocol is used to lock the update scope. If the insertion of the new element will not cause an overflow in the node then the new element is inserted and the node and its affix written in-place (logic blocks 101-103). If the insertion causes an overflow then the following is done iteratively until an insertion-safe node is found (logic blocks 104-105, 101):

1. shadow write two new nodes (with affix) containing $$\text{ceiling}\left(\frac{m}{2}\right) - 1 \text{ and } m - \text{ceiling}\left(\frac{m}{2}\right)$$

key/data elements respectively.

2. prepare to insert new router in parent.
   3. if the parent is not insertion-safe then using the parent node go to 1 above.

When this is completed the new router is inserted into the insertion-safe node and it and its associated affix is written in-place (logic block 103).

Figure 5:
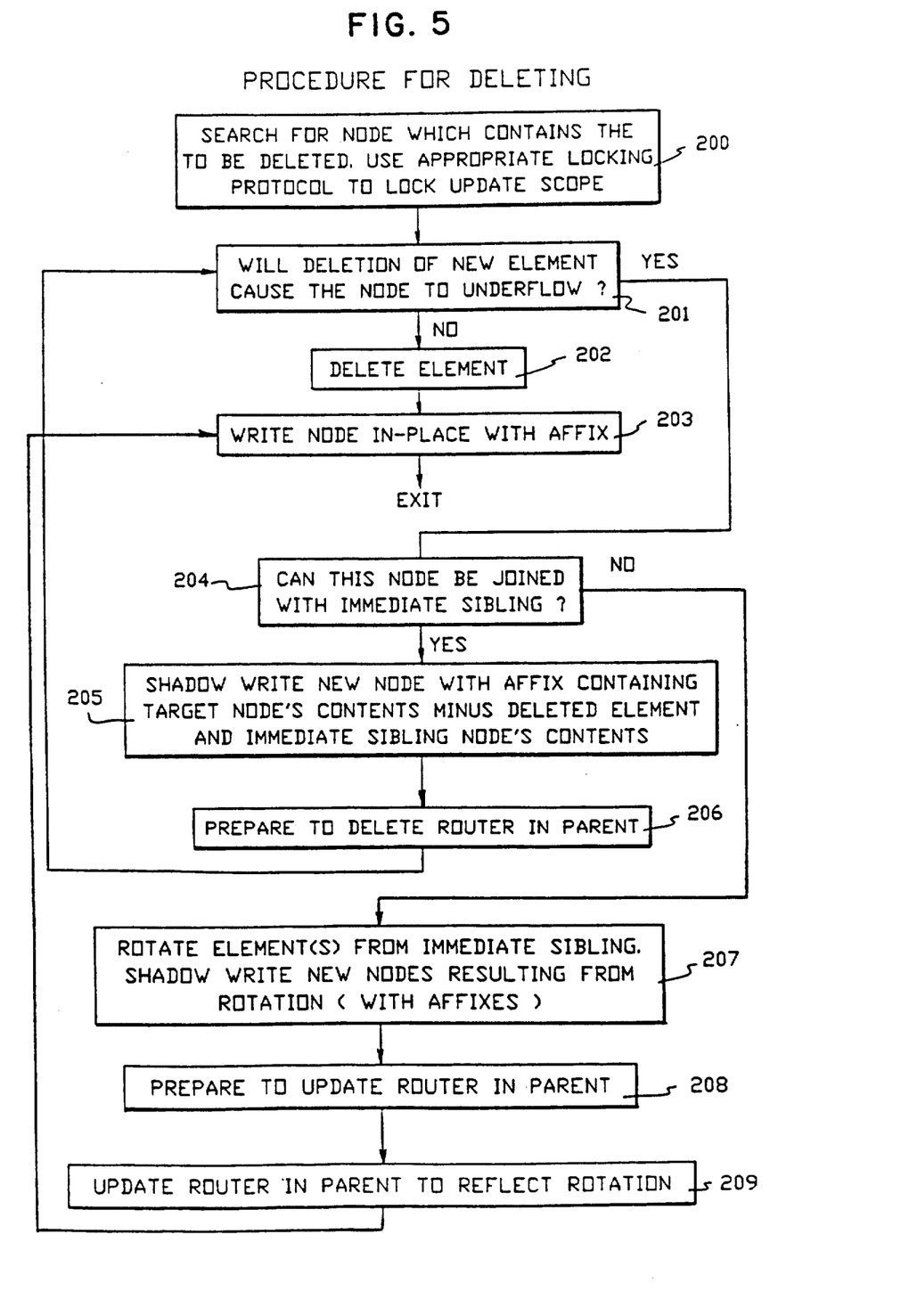
FIG. 5 is a flow diagram of deletion in accordance with the present invention.

FIG. 5 shows the procedure that is followed during the deletion of an element in the B+-tree. The standard B+-tree search technique is used to find the leaf node that contains the element to be deleted (logic block 200). An appropriate locking protocol is used to lock the update scope. If the deletion of the element will not cause an underflow in the node then the element is deleted and the node and its affix written in-place (logic blocks 201-203). If the deletion causes an underflow then an immediate sibling is checked to see if the two nodes can be joined into one (logic block 204). If they can, then they are combined into a new node which is shadow written with an affix. This will cause a router to be deleted in the parent so the parent node is selected and processing iterates back to logic block 201 to check for underflow due to the next deletion. If the two nodes can not be joined (i.e., the number of elements in the two nodes exceeds m-1) then the two nodes are balanced by rotating elements from the immediate sibling so that the node undergoing deletion no longer underflows (207). The newly balanced nodes resulting from this rotation are shadow written along with their affixes. Then the router in the parent is updated to reflect the new dividing key between the two rotated nodes (logic block 208-209) and the parent node with its associated affix is then written in-place (logic block 203).

Figure 6:
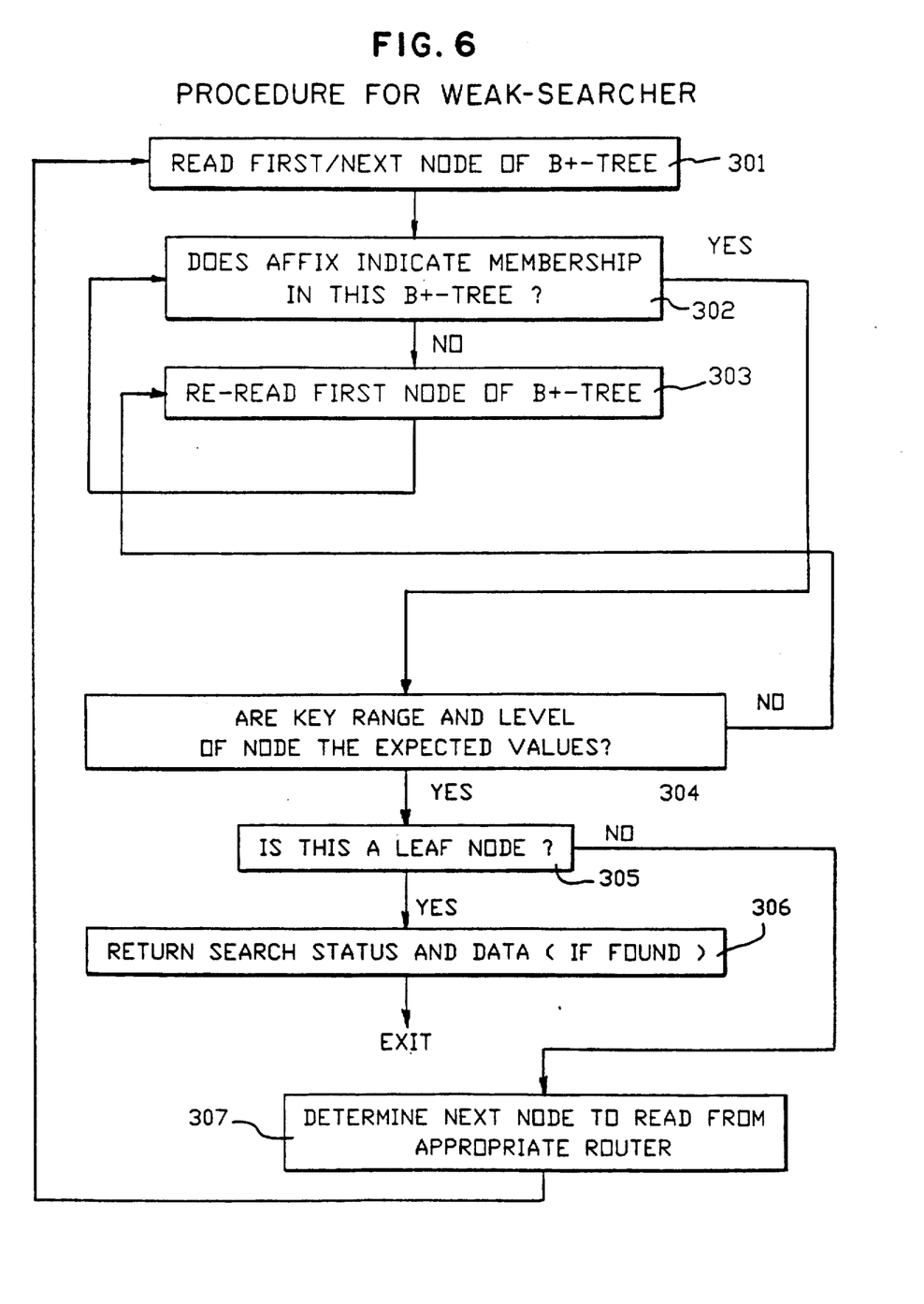
FIG. 6 is a flow diagram of the procedure followed by weak searchers in accordance with the present invention.

FIG. 6 shows the procedure that is followed by readers (i.e., weak-searchers). The first node (i.e., root) of the B+-tree is read (logic block 301). The affix is checked for the correct object identity (logic block 302) and if it is incorrect a retry is attempted (logic block 303, 301). The affix will indicate an error if the node has been deleted from the B+-tree and reused in some other object between the time that the searcher starts and the subsequent inspection of the node. If the node passes the affix check, then the key range and level of the node are checked for the expected key range (in the case of the root this is the key range of the entire B+-tree) and level at logic block 304. If the key range is incorrect, the search is restarted at logic block 303. The key range may be incorrect if the node has been deleted and subsequently reused as another node in the B+-tree during the search. If the node is a leaf node, it is now searched for the target data and the search status and target data, if found, are returned to the client (logic block 305-306). If the node is not a leaf, then the next node to search is determined by scanning the routers (logic block 307) and the search continues at logic block 301.

While the invention has been described in its preferred embodiments, it is to be understood that changes in form and details of the above description may be made without departing from the true scope and spirit of the invention.

I claim:

1. A computer implemented method for performing an update to a data structure of nodes connected by address pointers while permitting weak searcher processes including processes which seek to read data values with no intent to update them and which can accept data values which were valid at sometime between beginning and end of the search, to read the data structure without locking, comprising, the steps of:
    if the domain of said update is contained in one node, updating said data structure by updating said one node in place;
    if the domain of said update exceeds one node, updating said data structure by updating the deepest safe node in said domain in place and shadow-writing updated nodes in said domain other than said deepest safe node;
    giving weak searcher processes read access to said data structure without placing locks on nodes in said data structure; and
    providing a procedure for reusing storage occupied by nodes that become disconnected from said data structure as a result of said shadow-writing of updated nodes,
    said procedure for reusing storage also allowing weak searcher processes that may be searching in said nodes which become disconnected to successfully complete their search.

2. The method defined in claim 1 and further comprising the step of:
    before updating any node in the domain of an update, locking the nodes contained in the domain of said update until said update is completed.

3. The method defined in claim 1 wherein said deepest safe node in the domain of an update that exceeds one node is updated by replacing an address pointer in said deepest safe node so that said replaced address pointer points to one of said shadow-written updated nodes rather than the unupdated version of one of said shadow-written node, thereby disconnecting from said data structure the unupdated version of at least one shadow-written node.

4. The method defined in claim 1 wherein said procedure for reusing storage comprises the step of:
    waiting for all weak searcher processes active at the time a node becomes disconnected to complete reading before allowing the storage occupied by said disconnected node to be reused.

5. The method defined in claim 1 wherein said procedure for reusing storage comprises the steeps of:
    providing a specified time period for said weak searcher processes to read said data structure;
    terminating any of said weak searcher processes that have not completed reading of said data structure within said specified time period;
    restarting said terminated weak searcher processes; and
    allowing storage occupied by a disconnected node to be reused after a time interval has expired,
    said time interval starting at the time said disconnected node became disconnected and having a duration no less than said specified time period.

6. The method defined in claim 1 wherein said procedure for reusing storage comprises the step of:
    allowing storage occupied by a disconnected node to be reused immediately in said data structure;
    having each weak searcher process determine whether each node encountered during its weak search is valid,
    said each weak searcher process restarting its weak search at the beginning of said data structure if an invalid node is encountered during its weak search.

7. The method defined in claim 6 wherein said step of having each weak searcher process determine whether each encountered node is valid comprises the steps of:
    providing a a time field in each node of said data structure;
    recording in said time field the time when said each node was added to said data structure; and
    having each weak searcher process check said time field in each node encountered during its weak search,
    any node encountered during its weak search which has a value in said time field that is later than the entry time into said data structure by said encountering weak searcher process being an invalid node.

8. The method defined in claim 6 wherein said step of having each weak searcher process determine whether each encountered node is valid comprises the steps of:
    having each weak searcher process check the key range and the level of each node encountered during its weak search,
    any node encountered during its weak search having a key range or level which does not have a value expected by said encountering weak searcher process being an invalid node.

9. The method defined in claim 1 wherein said procedure for reusing storage comprises the steps of:
    allowing storage occupied by a disconnected node to be reused immediately in said data structure;
    having each weak searcher process determine whether each node encountered during its weak search is valid,
    said each weak searcher process restarting its weak search at the beginning of said data structure if an invalid node is encountered during its weak search;
    said step of having each weak searcher process determine whether each node encountered during its weak search is valid comprising:
    providing an affix field in each node for identifying nodes which are part of said data structure;
    placing a unique object identifier in said affix field of each node which is part of said data structure; and
    for each node encountered by a weak searcher process during its weak search, checking said object identifier in said affix field to determine whether said encountered node is part of said data structure, any node not part of said data structure being an invalid node.

10. The method defined in claim 9 wherein said step of having each weak searcher process determine whether each encountered node is valid comprises the steps of:

providing a a time field in each node of said data structure;

recording in said time field the time when said each node was added to said data structure; and having each weak searcher process check said time field in each node encountered during its weak search, any node encountered during its weak search which has a value in said time field that is later than the entry time into said data structure by said encountering weak searcher process being an invalid node.

11. The method defined in claim 9 wherein said step of having each weak searcher process determine each encountered node is valid comprises the steps of:

having each weak searcher process check the key range and the level of each node encountered during its weak search, any node having a key range or level which does not have a value expected by said encountering weak searcher process being an invalid node.

* * * * *